Oct. 26, 1965 A. H. BOHR ETAL 3,213,573
EXTENSIBLE AND RETRACTABLE MEMBER
Filed July 12, 1962 4 Sheets-Sheet 1
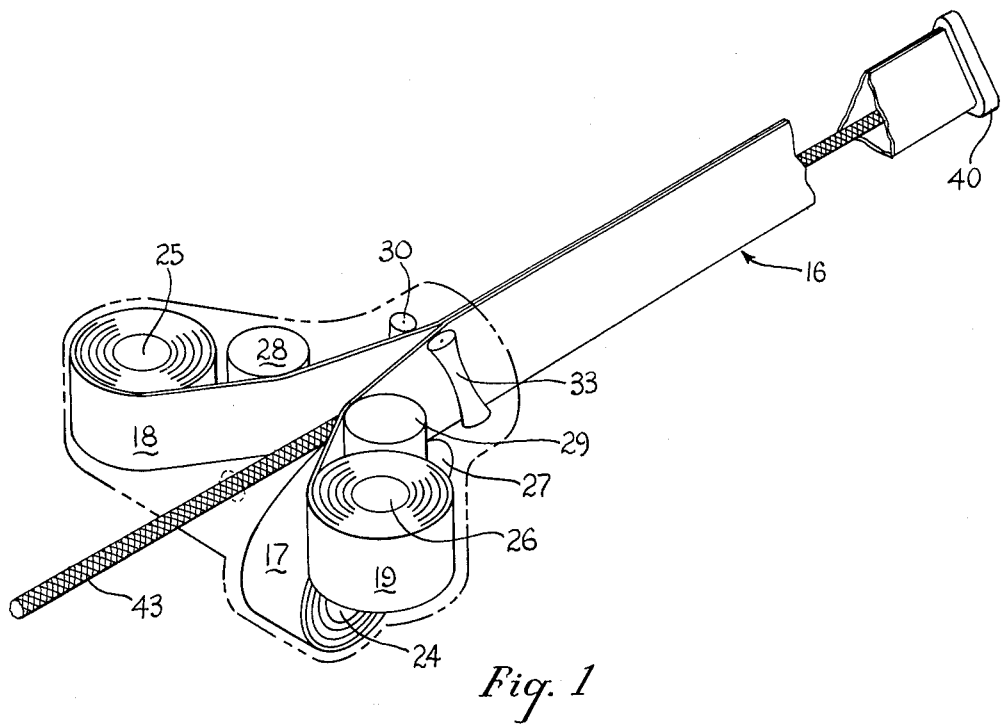
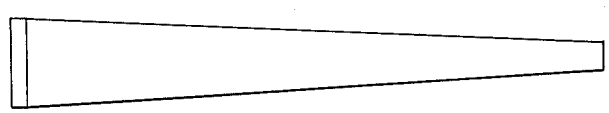 
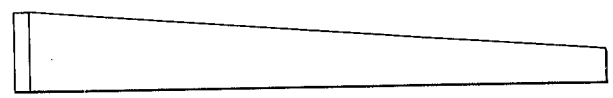 
INVENTORS
ALEXANDER H. BOHR
WALTER O. BORCHERDT
BY
AGENT

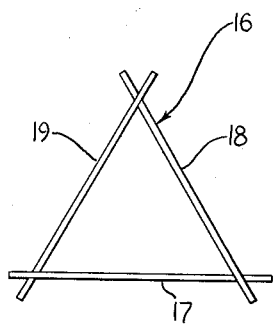
*Fig. 3*
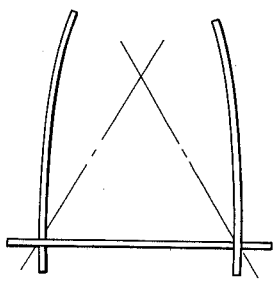
*Fig. 6*
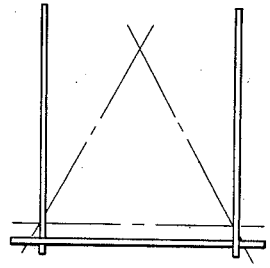
*Fig. 9*
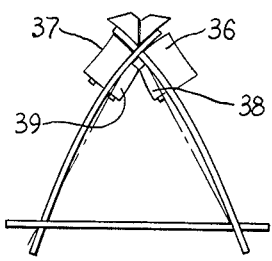
*Fig. 4*
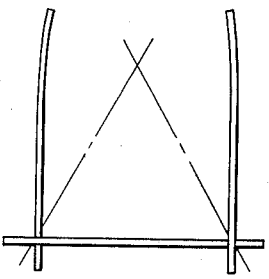
*Fig. 7*
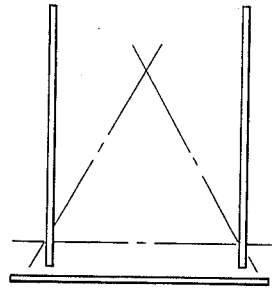
*Fig. 10*
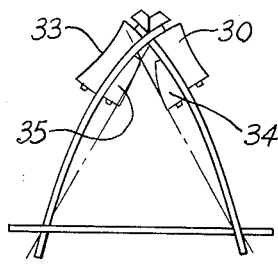
*Fig. 5*
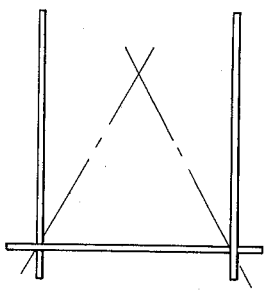
*Fig. 8*
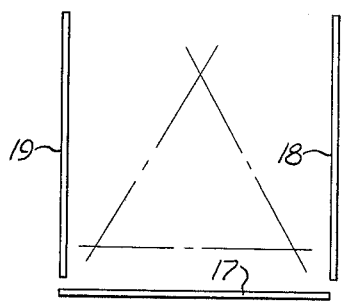
*Fig. 11*
INVENTORS
ALEXANDER H. BOHR
WALTER O. BORCHERDT
BY
AGENT

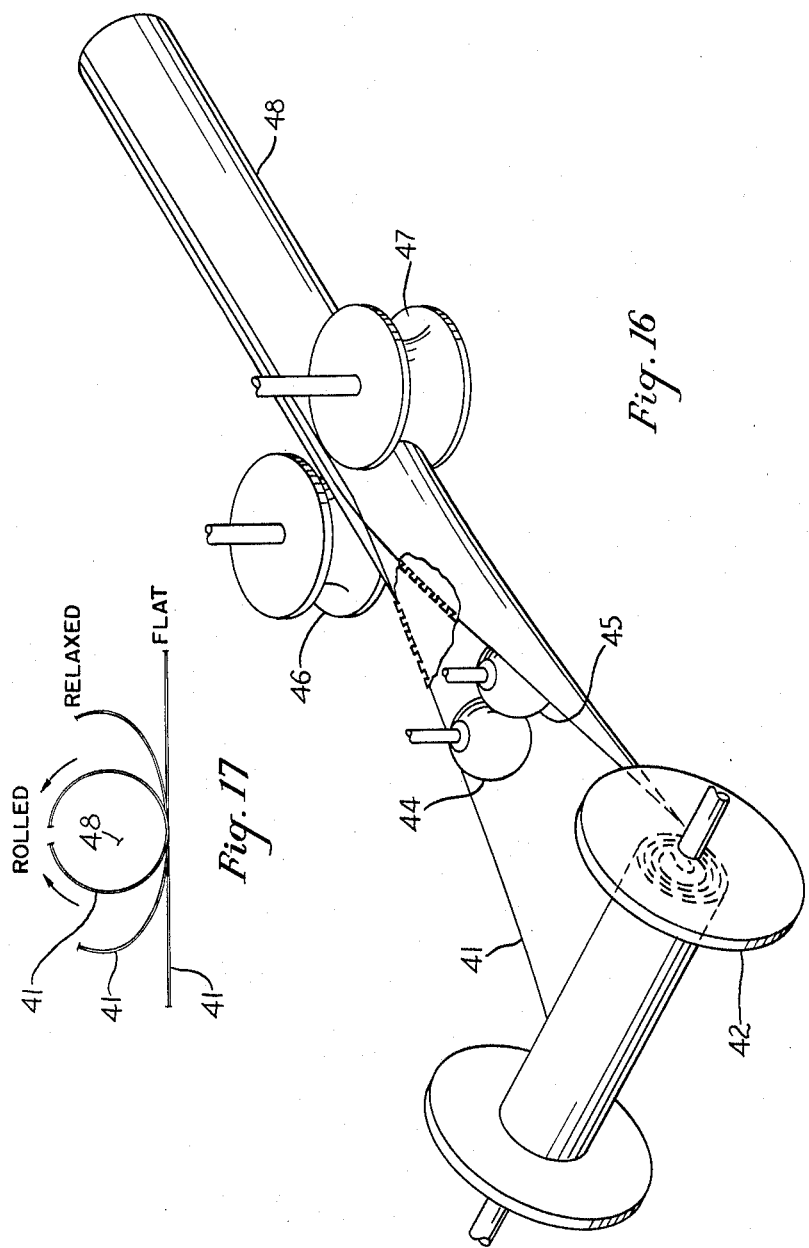

United States Patent Office 3,213,573
Patented Oct. 26, 1965

3,213,573
EXTENSIBLE AND RETRACTABLE MEMBER
Alexander H. Bohr, Sparta, and Walter O. Borcherdt, Mountain Lakes, N.J., assignors to Thiokol Chemical Corporation, Bristol, Pa., a corporation of Delaware
Filed July 12, 1962, Ser. No. 209,357
5 Claims. (Cl. 52—108)

This invention relates generally to extensible and retractable members and more particularly to such members and a method of forming the same which may be used as rigid supports for loads applied axially thereof and/or laterally therealong as in the case of aerial masts or derrick booms.

As is well known, extensible members have useful application in many different arts as: antennae in communications; supports for platforms used in the harvesting of fruit and in the inspection or servicing of machinery; as elevators for fire hoses, loading of supplies, etc., and as autojacks, aerial masts, machinery booms, etc.

Usually such extensible or retractable members are of the telescopic type which involves related problems of length of span and span strength, their support or reinforcing by adjacent spans, and number of spans to effect a desired amount of extension—all of which have to be reconciled with practical considerations such as the support of the member in both the extended or retracted position and particularly its bulk in the latter position. Such problems are, of course, increased if the direction of extension is other than vertical and rigidity is required of the member.

Accordingly, the main object of the present invention is to provide an extensible and retractable member and method of forming the same which is strong and rigid when extended and free of the above and other problems characterizing known devices.

An important object of the present invention is to provide a rigid extensible member for use as a boom, mast, etc. and method of forming the same which will have a very small volume or bulk when retracted.

Another important object of the present invention is to provide a rigid extensible member of the type described by successively assembling or connecting adjacent portions of a plurality of similar members and to retract the same by successively disassembling such portions.

A further important object of the present invention is to provide an extensible, rigid member for use as a boom, etc. which is formed and extended by successively connecting the adjacent edges of a plurality of strips of strong material to form a rigid box structure and which is retracted by successively disconnecting such strips and storing them separately from each other.

A still further object of the present invention is to provide an extensible, retractable member for use as a rigid boom, etc. which is extended by successively uniting similar flexible strips of material and which may be of varying cross section.

Another object of the present invention is to provide a rigid extensible member of the type described by successively connecting the edges of a single strip or member and to retract the same by successively disassembling the edge connections.

Other objects and advantages of the invention will become apparent during the course of the following description.

In the drawings we have shown three embodiments of the invention. In these showings, FIGURE 1 is a fragmentary, diagrammatic, perspective view of the forming and extension of the member comprising the present invention;

FIGURE 2 is a fragmentary view thereof to an enlarged scale illustrating the progressive connection (and disconnection) of the edge portions of the similar extensible member, the peel forming rolls being omitted for clarity;

FIGURES 3 to 11, inclusive, are respectively vertical sectional views taken on the lines 3—3 to 11—11, inclusive, of FIGURE 2 showing the separation of the edges of the flexible strips during retraction of the extensible member;

FIGURE 12 is a side elevational view of the extended portion of a modified form of the member which is formed of a greater number of strips which cooperate to provide a uniform taper;

FIGURE 13 is a right end elevational view thereof;

FIGURE 14 is a view similar to FIGURE 12 of a further modification of the invention wherein the strips provide a non-uniform taper; and FIGURE 15 is a right end elevational view thereof.

FIGURE 16 is a view similar to FIGURE 1 showing one strip formed into a tube;

FIGURE 17 is a cross-sectional view of the single strip of FIGURE 16 showing the strip in its pre-formed, relaxed position and in its flat and rolled position.

Figure 2:
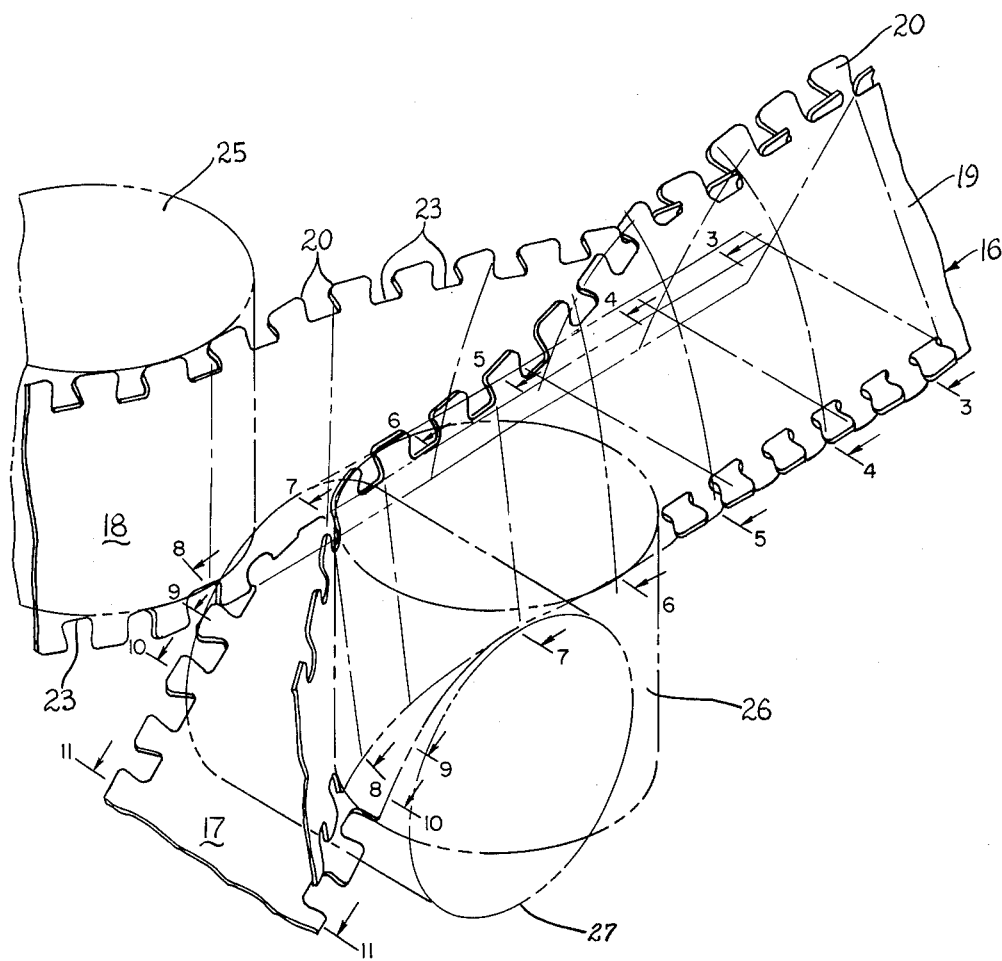

Referring to the drawings, numeral 16 designates the extensible, retractable rigid member as a whole which is formed, as shown in FIGURES 1 to 11, inclusive, by uniting three flexible strips 17, 18 and 19 along their longitudinal edges. The material of the strips is preferably metal but could be of strong plastic, etc. in certain applications.

The edges of the strips 17, 18, and 19 are strongly interlocked together in the assembled position by means of alternate tongues 20 and slots 23 formed in the edges of the strips. The edges of each tongue are tapered inwardly while the sides of the slots are tapered outwardly with respect to the edges of the strips. The minimum width of each tongue 20 is slightly greater than the minimum width of each slot 23 so that the tongues and slots in the edges of adjacent strips may readily interfit in an interlocking position (FIGURE 2) and retained by the heads or wider parts of the tongues in their cooperating slots.

As shown in FIGURE 1, the flexible strips 17, 18 and 19 which comprise the rigid extensible and retractable member 16 are coiled respectively on wind-up drums 24, 25 and 26 which are mounted on a support (not shown) by power driven synchronized shafts (not shown) so that the three strips may be extended or retracted together in the forming or unforming of the rigid extensible member 16.

The tongued and slotted edges of the flexible strips 17, 18 and 19 are brought into juxtaposition and interlocking by a plurality of peeler drums and spaced sets of peeler rolls (FIGURES 1, 2, 4 and 5). The strip 17 is unwound from the drum 24 and while disposed in a horizontal plane is lifted into position adjacent the bottom edges of the strips 18 and 19 by a peeler drum 27. Simultaneously, the strips 18 and 19 are unwound from their wind-up drums 25 and 26 and pass around their peeler drums 28 and 29 upon which their lower edges are interlocked with the edges of strip 17.

The strips 18 and 19 then pass between peel forming rolls 30 and 33 and their cooperating forming rolls 34 and 35 which bend the strips so that their tongues 20 project through the adjacent slots 23 of the other strips, the optimum angle of bend being 90° for easy connection as shown in FIGURE 5. The connected strips then pass through peel forming rolls 36, 37 and their cooperating forming rolls 38, 39 which straighten the flexible strips so that all three are rigidly united as shown in FIG. 3. The plurality of flexible strips 17, 18, and 19 are thus interlocked to form a rigid member of desired length which may be used as a boom, mast, footbridge support, etc.

As already indicated by FIGURES 3 to 11, inclusive, the forming of the rigid member 16 by extending the flexible strips from their position of storage on the reels 24, 25 and 26 to the desired extent is reversible to retract the rigid member 16, the portion beyond the forming and peel rolls remaining rigid and connected while the portion adjacent the wind-up reels is separated into the flexible strips 17, 18 and 19 and stored on their reels with a minimum of space requirements. The retraction of the rigid member 16 is graphically and progressively illustrated in order by the FIGURES 3 to 11, inclusive, from the connected rigid position of FIGURE 3 to the separated flexible strip position of FIGURE 11 as the strips are about to be rewound on their wind-up reels.

It is important when retracting the extensible member 16 that the retraction phase be limited so as to avoid complete separation of the outer ends of the strips and to this end, a stop member 40 is mounted on the outer end of the rigid member 16 and is of such size and shape as to be unable to pass between the outer set of peeler rolls and thus positively limit the retraction. Also, since the rigid member 16 is hollow, a signal cable, hose, or duct of any general type can be placed inside the member 16 as shown at 43 and be extended as the member 16 is extended.

As illustrated by the other embodiments of the invention in FIGURES 12 to 15, more than three flexible strips, each of uniform diameter may be used to accommodate boom strengths of arbitrant nature. FIGURE 12 employs strips of uniform variation in width to obtain a uniform taper of the rigid member 16 while FIGURE 14 employs strips of varying width to obtain a non-uniform taper. These variations only require different or adjustable peel forming rolls and stripper drums.

It will now be readily apparent that the flexible strips extend from a compact storage area to form a rigid extended member usable as a boom, mast, etc. depending on the direction of extension and purpose, which will be strong in tension, compression, and torsion depending on the relative expected load distribution.

In FIGURE 16 is shown an extensible and retractable member formed from a single strip into a tube of substantially circular cross-section and locked thereby one of the means previously described for a plurality of strips. Flexible strip 41 is wound flat on reel 42 from which it extends past and in contact with guide rollers 44 and 45 and enters concave forming rolls 46 and 47. As the edges of strip 41 come together they are connected by the various means previously described thus forming the member 48. In order that member 48 may be substantially circular in cross section, strip 41 is preformed to the "relaxed" cross-sectional shape shown in FIGURE 17. Strip 41 is then wound flat on reel 42 for storage. As it unwinds and is formed into a tubular member with its edges connected, this pre-formed shape causes the member 48 to be substantially circular rather than oval-shaped, thus improving the bending strength characteristics of member 48.

It is to be understood that the forms of our invention herewith shown and described are to be taken as preferred examples of the same and that various changes in the shape, size, and arrangement of parts may be resorted to without departure from the spirit of the invention or the scope of the subjoined claims.

We claim:

1. An extensible member for use as a boom, etc. comprising, in combination, a plurality of separate identical strips each having a plurality of alternate interlockable dovetail shaped tongues and slots formed along its edges, with the minimum width of said tongues being greater than the minimum width of said slots and means for simultaneously guiding an equal portion of each of said strips in an amount equal to the extension desired into self-interlocking edge to edge contact and engagement with each other to form a rigid unitary structure.

2. A rigid unitary member for use as a boom, etc. comprising a length of self-interlocked connected portions of a plurality of identical flexible strips extending from a position of unconnected storage, the edges of each of said strips including alternate interlockable dovetail shaped tongues and slots for interlocking engagement with the slots and tongues of adjacent strips when disposed in edge to edge engagement upon extension to connected position from storage, the minimum width of said tongues being greater than the minimum width of said slots.

3. The combination recited in claim 2 wherein a greater or lesser extent of self-interlocked connected portions may extend from said storage position to form a longer or shorter rigid member, and a stop is mounted on the outer end of said extended self-interlocked connected strip portions to limit the shortness thereof.

4. An extensible member for use as a boom, etc. comprising, in combination, a single flexible strip having a plurality of alternate interlockable dovetail shaped tongues and slots formed along its edges, with the minimum width of said tongues being greater than the minimum width of said slots and means for guiding a portion of said strip equal in length to the amount of extension desired into self-interlocking edge to edge contact and engagement of its edges to form a rigid, self-interlocked structure.

5. The combination recited in claim 4 wherein said strip is preformed to have an arcuate untensioned shape so as to be of circular cross-section when its edges are engaged and interlocked.

References Cited by the Examiner

UNITED STATES PATENTS

| 2,130,993 | 9/38 | Dubilier | 189—23 |
| 2,799,368 | 7/57 | Alter | 189—14 |
| 2,905,282 | 9/59 | Miller | 189—34 |
| 3,144,104 | 8/64 | Weir et al. | 189—34 |

RICHARD W. COOKE, Jr., *Primary Examiner.*

BENJAMIN BENDETT, *Examiner.*